United States Patent
Stiesdal

(10) Patent No.: US 8,966,902 B2
(45) Date of Patent: Mar. 3, 2015

(54) STORAGE AND RECOVERY OF THERMAL ENERGY BASED ON COUNTER CURRENT PRINCIPLE OF HEAT TRANSFER MEDIUM TRANSPORTATION

(75) Inventor: Henrik Stiesdal, Odense C (DK)

(73) Assignee: Siemens Aktiengesellschaft, München (DE)

( * ) Notice: Subject to any disclaimer, the term of this patent is extended or adjusted under 35 U.S.C. 154(b) by 102 days.

(21) Appl. No.: 13/809,428

(22) PCT Filed: Oct. 29, 2010

(86) PCT No.: PCT/EP2010/066526
§ 371 (c)(1),
(2), (4) Date: Jan. 10, 2013

(87) PCT Pub. No.: WO2012/007068
PCT Pub. Date: Jan. 19, 2012

(65) Prior Publication Data
US 2013/0111903 A1    May 9, 2013

(30) Foreign Application Priority Data
Jul. 12, 2010  (EP) .................................... 10007149

(51) Int. Cl.
| F01K 1/00  | (2006.01) |
| F28D 17/02 | (2006.01) |
| F28D 17/04 | (2006.01) |
| F28D 20/00 | (2006.01) |
| F28F 27/02 | (2006.01) |
| F01K 3/00  | (2006.01) |
| F01K 3/18  | (2006.01) |

(52) U.S. Cl.
CPC ................ *F28D 17/04* (2013.01); *F28D 20/00* (2013.01); *F28D 20/0056* (2013.01); *F28F 27/02* (2013.01); *F01K 3/004* (2013.01); *F01K 3/186* (2013.01); *Y02E 60/142* (2013.01)
USPC ............................................... 60/659; 165/10

(58) Field of Classification Search
USPC ......... 60/659; 165/10, 135, 96; 219/472, 378, 219/530, 531
See application file for complete search history.

(56) References Cited

U.S. PATENT DOCUMENTS

| 4,142,576 A | 3/1979 | Perry |
| 4,520,862 A | 6/1985 | Helmbold |
| 5,436,508 A | 7/1995 | Sorensen |

(Continued)

FOREIGN PATENT DOCUMENTS

| AT | 409792 B | 11/2002 |
| CH | 686641 A5 | 5/1996 |

(Continued)

*Primary Examiner* — Hoang Nguyen

(57) ABSTRACT

A thermal energy storage device is provided. The device has a heat exchanger arrangement for guiding a flow of a heat transfer medium between a first end and a second end of the heat exchanger arrangement, and a heat storage material surrounding the heat exchanger arrangement. The heat exchanger arrangement transports the heat transfer medium from the first end to the second end if the thermal energy storage device is in a first operational mode, in which the heat storage material is supposed to receive thermal energy from the heat transfer medium, and transports the heat transfer medium from the second end to the first end if the thermal energy storage device is in a second operational mode, in which the heat storage material is supposed to release thermal energy to the heat transfer medium.

13 Claims, 4 Drawing Sheets

(56) References Cited

U.S. PATENT DOCUMENTS

| | | | |
|---|---|---|---|
| 6,877,549 B2 * | 4/2005 | Hirano ............................ | 165/10 |
| 2008/0016866 A1 | 1/2008 | Mohr | |
| 2008/0066736 A1 | 3/2008 | Zhu | |
| 2011/0146940 A1 * | 6/2011 | Golbs et al. ..................... | 165/10 |
| 2012/0067047 A1 * | 3/2012 | Peterson et al. ................ | 60/651 |
| 2013/0068418 A1 * | 3/2013 | Gotland et al. ................. | 165/45 |
| 2013/0098317 A1 * | 4/2013 | Schatz ...................... | 123/41.44 |

FOREIGN PATENT DOCUMENTS

| | | |
|---|---|---|
| DE | 2828675 A1 | 1/1980 |
| DE | 9401979 U1 | 11/1994 |
| EP | 2017561 A2 | 1/2009 |
| FR | 2566883 A1 | 1/1986 |
| WO | WO 9214054 A1 | 8/1992 |

\* cited by examiner

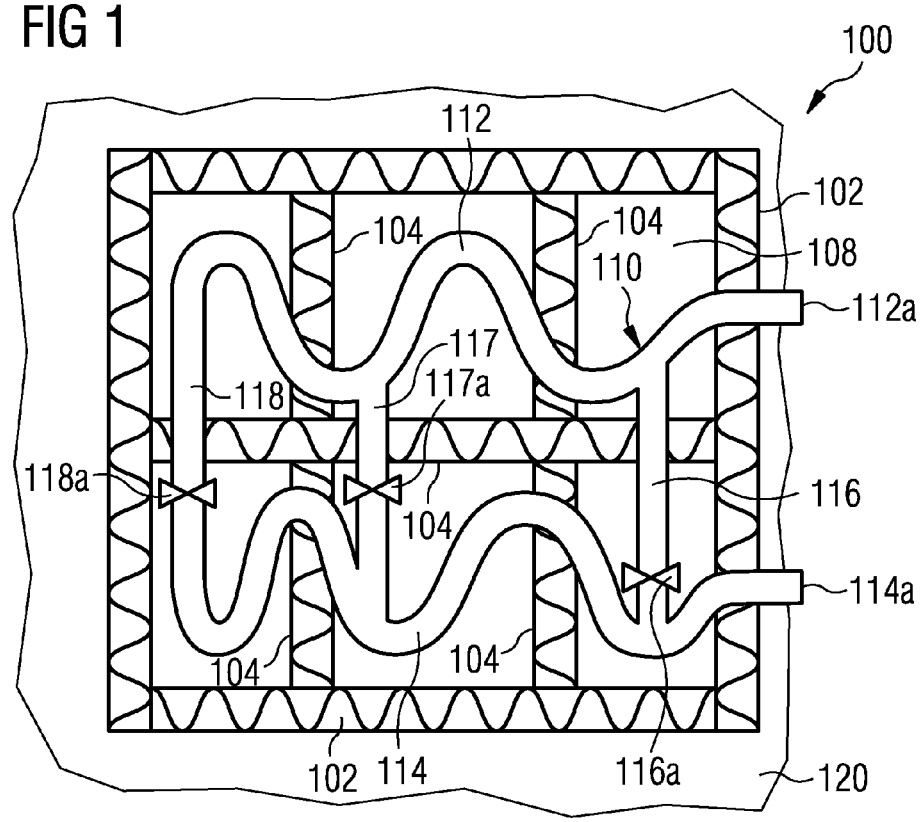
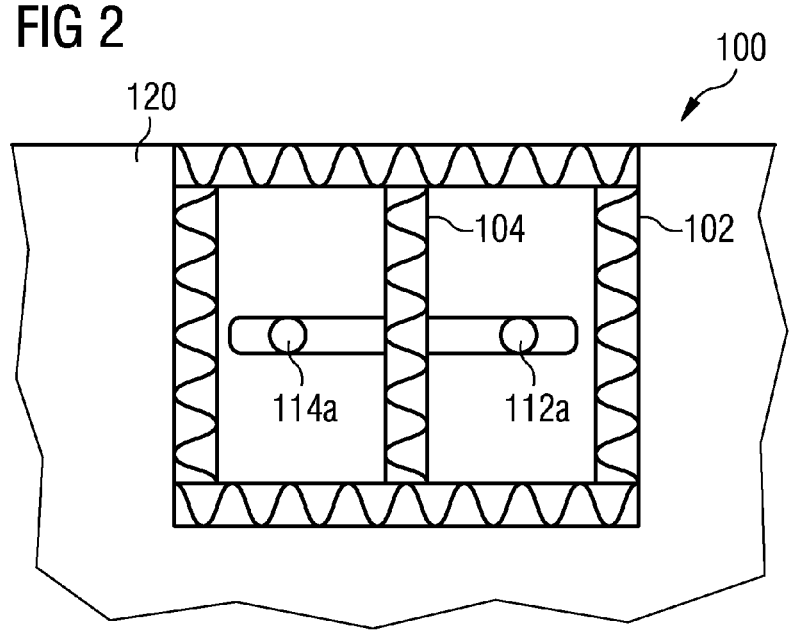

STORAGE AND RECOVERY OF THERMAL ENERGY BASED ON COUNTER CURRENT PRINCIPLE OF HEAT TRANSFER MEDIUM TRANSPORTATION

CROSS REFERENCE TO RELATED APPLICATIONS

This application is the U.S. National Stage of International Application No. PCT/EP2010/066526 filed Oct. 29, 2010 and claims the benefit thereof. The International Application claims the benefits of the European application No. 10007149.7 filed Jul. 12, 2010, both of the applications are incorporated by reference herein in their entirety.

FIELD OF INVENTION

The present invention relates to the field of temporarily storing thermal energy. In particular, the present invention relates to a thermal energy storage device comprising a heat exchanger arrangement and a heat storage material. Further, the present invention relates to a thermal energy storing and recovering system comprising such a thermal energy storage device and to a method for operating such a thermal energy storage device.

ART BACKGROUND

The production of electric power from various types of alternative energy sources such as for instance wind turbines, solar power plants and wave energy plants is not continuous. The production may be dependent on environmental parameters such as for instance wind speed (for wind turbines), insulation (for solar power plant) and wave height and direction (for wave energy plants). There is very often little or no correlation between energy production and energy demand.

One known approach to solve the problem of uncorrelated electric power production and electric power demand is to temporally store energy, which has been produced but which has not been demanded, and to release the stored energy at times at which there is a high demand. In the past there have been suggested many different methods to temporarily store energy. Suggested methods are for instance (a) mechanical energy storage methods e.g. pumped hydro storage, compressed air storage and flywheels, (b) chemical energy storage methods e.g. electrochemical batteries and organic molecular storage, (c) magnetic energy storage, and (d) thermal energy storage.

WO 9214054 A1 discloses a wind-powered energy production and storing system comprising a wind rotor in driving engagement with a power generator via transmission means, to which is also connected a heat pump for operation of at least one heat exchanger unit. The wind rotor is designed as a wind wheel having a rim in direct driving engagement with a main shaft positioned in a subjacent engine housing to which main shaft, in addition to the power generator and the heat pump, a dual circulation pump is coupled for conveying heated and cooled liquid, from a heating container and a cooling container, respectively, positioned in the engine housing to separate heat and cold storing stations. Via a steam separator and a pumping device, a steam generator may be connected to the heat storing station, which via a steam turbine drives an additional power generator for power production during periods of slack winds. The storing stations may be buried in soil having a filling of sand, stones or similar materials. One disadvantage of this wind-powered energy production and storing system is that there is a direct mechanical connection between the energy storing system and the wind turbine and that all the energy storage equipment, besides the storing stations, is placed in the wind turbine resulting in a complex mechanical arrangement of the system components. This causes the known system to be not flexible.

There may be a need for improving the temporal storage of thermal energy in particular with respect to the flexibility and the efficiency of a thermal energy storage system.

SUMMARY OF THE INVENTION

This need may be met by the subject matter according to the independent claims. Advantageous embodiments of the present invention are described by the dependent claims.

According to a first aspect of the invention there is provided a thermal energy storage device, which comprises (a) a heat exchanger arrangement, which is configured for guiding a flow of a heat transfer medium between a first end of the a heat exchanger arrangement and a second end of the heat exchanger arrangement, and (b) a heat storage material, which surrounds the heat exchanger arrangement. The heat exchanger arrangement is adapted to transport the heat transfer medium from the first end to the second end, if the thermal energy storage device is in a first operational mode, in which the heat storage material is supposed to receive thermal energy from the heat transfer medium. Further, the heat exchanger arrangement is adapted to transport the heat transfer medium from the second end to the first end, if the thermal energy storage device is in a second operational mode, in which the heat storage material is supposed to release thermal energy to the heat transfer medium.

The described thermal energy storage device is based on the idea that by using different transport directions of the heat transfer medium for different operational modes a highly efficient thermal energy storage can be realized. The described principle of using (a) a first transport direction for charging the heat storage material with thermal energy and (b) an opposite second transport direction for discharging the heat storage material from thermal energy can be interpreted as employing a counter current principle.

Specifically, in the first operational mode (i.e. charging the heat storage material with thermal energy), a hot heat transfer medium is let into the first end. After having transferred at least a part of its thermal energy the at least partially cooled down heat transfer medium is returned at the second end. Correspondingly, in the second operational mode (i.e. discharging thermal energy from the heat storage material), a comparatively cold heat transfer medium is let into the second end. After having received thermal energy from the heat storage material the at least partially heated up heat transfer medium is returned at the first end.

In other words, when taking benefit from the described counter current principle the inlet end of the heat exchanger arrangement for hot heat transfer medium when charging the thermal energy storage device is the same as the outlet end of the heat exchanger arrangement for heated up heat transfer medium when discharging the thermal energy storage device. Correspondingly, the outlet end of the heat exchanger arrangement for cooled down heat transfer medium when charging the thermal energy storage device is the same as the inlet end of the heat exchanger arrangement for cold heat transfer medium when discharging the thermal energy storage device.

By using the above described counter current principle, when energy is recovered from the thermal energy storage device, it is possible to heat up the cold heat transfer medium to nearly the same temperature as the inlet temperature of the hot heat transfer medium when thermal energy is inserted into the thermal energy storage device. In this way, if the hot heat transfer medium comprises heated steam, the heated up (originally) cold heat transfer medium may also comprise heated steam which then may be used directly to drive a steam turbine without any further heating means. Thereby, the efficiency of the heat storage process can be significantly increased.

The heat transfer medium may be a fluid, i.e. a liquid or a gaseous medium. Preferably, the heat transfer medium is a steam at least when the heat transfer medium is at its higher temperature. This may mean that when charging thermal energy into the described thermal energy storage device, the heat transfer medium, which is inserted into the heat exchanger arrangement is at least partially gaseous. When the heat transfer medium leaves the heat exchanger arrangement it may have become liquid again. Correspondingly, when discharging or extracting thermal energy from the described thermal energy storage device, a cold liquid fluid may be heated up such that it is converted into a gaseous or at least partially gaseous steam. This may be in particular advantageous if the extracted thermal energy is used for driving a steam turbine which itself drives an electric power generator.

It is mentioned that the thermal energy storage device may also comprise two or even more heat exchanger arrangements each having the described first end and the described second end. Thereby, at least one and preferably all of the heat exchanger arrangements can be operated by employing the above described counter currents principle.

According to an embodiment of the invention the heat exchanger arrangement comprises (a) a first heat exchange section being associated with the first end, (b) a second heat exchange section being associated with the second end, (c) a first connecting section connecting the first heat exchange section with the second heat exchange section and (d) a second connecting section connecting the first heat exchange section with the second heat exchange section parallel to the first connecting section. Thereby, at least one of the connecting sections comprises a valve for controlling the flow of the heat transfer medium through the respective connecting section. This may provide the advantage that the heat exchange capacity of the heat exchanger arrangement and/or the thermal energy storage capacity of the thermal energy storage device can be adapted to actual operating conditions. For instance by closing (opening) the valve the effective amount or mass of the heat storage material, which contributes to the described thermal heat storage, can be reduced (increased). The same holds for the overall heat transfer rate between the heat exchanger arrangement and the heat storage material.

Generally speaking, by changing the setting or the adjustment of the valve a decrease or an increase of the heat exchange capacity and of the thermal energy storage capacity may be realized. Thereby, the thermal energy storage device can be adapted to currently present operating conditions.

It is mentioned that apart from one or more valves also heating means and/or cooling means like e.g. heating circuits and/or cooling circuits may be used for operating the thermal energy storage device within an energy storage and recovering system in order to optimize the inlet and/or outlet temperatures of the described thermal energy storage device. Thereby, the energy storage efficiency may be further increased.

It is further mentioned that one or more of the valves may be thermostat controlled and/or remote controlled.

According to a further embodiment of the invention the heat storage material comprises a solid material such as in particular sand, soil, ashes, stones and/or gravel. Of course, also other materials which are preferably also relatively cheap and which comprise similar thermal properties may be used.

According to a further embodiment of the invention the thermal energy storage device further comprises thermal insulating means (a) for thermally isolating the whole thermal energy storage device from its environment and/or (b) for thermally isolating different regions of the thermal energy storage device from each other. This may provide the advantage that the thermal energy storage device can be at least partially thermally decoupled from its surrounding environment and/or different regions of the device can be at least partially thermally decoupled from each such that the effective size of the thermal energy storage device can be optimized in view of given operating conditions.

The thermal insulation means may comprise e.g. mineral wool, glass wool, rock wool or other preferably similar insulating materials.

According to a further embodiment of the invention the first end and the second end are located at one and the same side of the thermal energy storage device.

By placing the inlet end and the outlet end of the heat exchanger arrangement relatively close to each other a heat loss caused by long fluid (heat transfer medium) feeding pipes and/or long fluid return pipes to or from the heat exchanger arrangement can be minimized.

According to a further embodiment of the invention the thermal energy storage device further comprises a further heat exchanger arrangement, which is configured for guiding a flow of a heat transfer medium between a further first end of the further heat exchanger arrangement and a further second end of the further heat exchanger arrangement, wherein also the further heat exchanger arrangement is surround by the heat storage material. This may provide the advantage that a further heat transfer medium can be used for charging and/or discharging the described thermal energy storage device. Thereby, the further heat transfer medium may be a different fluid than the heat transfer medium. Alternatively, the further heat transfer medium and the heat transfer medium may be the same fluid, which however are guided through different heat transfer pipes through the heat storage material.

The various inlet ends and outlet ends of both the heat exchanger arrangement and the further heat exchanger arrangement may also just be used to let originally cold fluid and originally hot fluid flow in separate chambers or tubes of the thermal energy storage device. Thereby, in order to recover stored energy only the originally cold fluid is flowing through the device and in order to store energy the originally hot fluid is flowing through the device.

According to a further embodiment of the invention the heat exchanger arrangement and the further heat exchanger arrangement form a counter current heat exchanger system. Thereby, (a) the heat transfer medium within the further heat exchanger arrangement and the heat transfer medium within the heat exchanger arrangement are transportable simultaneously and (b) the heat transfer medium within the further heat exchanger arrangement is transportable in an opposite direction with respect to the heat transfer medium within the heat exchanger arrangement.

Generally speaking, the described counter current heat exchanger system may let both heat transfer media travel through the respective pipes of the heat exchanger arrangement respectively of the further heat exchanger arrangement at the same time but in opposite directions with respect to each other. In this way the heat transfer media move in opposite directions along each other in separate chambers or tubes of the counter current heat exchanger system. Thereby, the velocity of the hot inlet flow into the counter current heat exchanger system may differ from the velocity of the cold inlet flow into the counter current heat exchanger system. This may provide the advantage that the stored thermal energy can be slowly tapped or slowly stored depending on the velocity of the cold and/or the hot inlet flows.

According to a further embodiment of the invention there is provided a thermal energy storing and recovering system, which comprises (a) a thermal energy storage device as described above and (b) a heat generating arrangement, which is connected directly or indirectly to the thermal energy storage device and which is adapted to heat up the heat transfer medium, which has been received from the thermal energy storage device and which is supposed to be transported to the thermal energy storage device.

The described thermal energy storing and recovering system is based on the idea, that when the above described thermal energy storage device co-operates with a heat generating arrangement a highly efficient temporal heat storage and heat recovery can be realized.

The heat generating arrangement may be any device, which is capable of converting energy, in particular electric energy, into thermal energy. The generated respectively converted thermal energy is then transferred respectively to the thermal energy storage device via the heat transfer medium.

In case of a direct (thermal) connection between the thermal energy storage device and the heat generating arrangement, the heat transfer medium being used by the thermal energy storage device is the same as the operating medium of the heat generating arrangement. In case of an indirect connection different fluids may be used for the heat transfer medium and for the operating medium. The thermal connection between the two fluids may then be realized by means of a heat exchanger and/or by means of a condenser.

According to a further embodiment of the invention the heat generating arrangement comprises an electric boiler and/or a heat pump. This may provide the advantage that electric energy, which has been generated in particular by an alternative energy source such as a wind turbine, can be converted into heat which can be stored as thermal energy within the above described thermal energy storage device.

In particular a heat pump may provide the advantage of a very efficient heat generation. When using a heat pump electric energy may be first converted into mechanical energy of a compressor, which in accordance with the well known physical principle of a heat pump compresses a gaseous heat pump medium and circulates the same around a closed loop, which comprises inter alia a condenser and an evaporator. Thereby, the energy being released within the condenser may be used to heat up the heat transfer medium, which is then forwarded to the thermal energy storage device. In this respect it is mentioned that the described evaporator may be driven by air, by a further cooling means and/or by pumped return water e.g. from a district heating installation.

According to a further embodiment of the invention the thermal energy storing and recovering system further comprises a heat converting arrangement, which is connected directly or indirectly to the thermal energy storage device. The heat converting arrangement is adapted to (a) extract thermal energy from hot heat transfer medium, which has been received from the thermal energy storage device and (b) convert the extracted thermal energy into mechanical energy.

The mechanical energy may be converted into electric energy in particular by means of an electric generator, which is mechanically connected to the heat converting arrangement.

In case of a direct (thermal) connection between the thermal energy storage device and the heat converting arrangement, the heat transfer medium being used by the thermal energy storage device is the same as the operating medium of the heat converting arrangement. In case of an indirect connection different fluids may be used for the heat transfer medium and for the operating medium. The thermal connection between the two fluids may then be realized for instance by means of a heat exchanger and/or by means of an evaporator.

According to a further embodiment of the invention the heat converting arrangement comprises a steam turbine. This may provide the advantage that a highly efficient conversion of the recovered thermal energy can be achieved.

Thereby, a rotating shaft of the steam turbine may be connected to an electric power generator, which is capable of converting the mechanical energy being provided by the steam turbine into electric energy, which can be easily fed to a utility grid and/or which can be directly consumed by at least one electric consumer.

The steam turbine may be connected to a condenser, wherein the operating medium of the steam turbine, after it has been delivered its energy to the steam turbine, is converted into its liquid phase.

The described condenser may be a part of a further closed loop, which apart from the steam turbine and the condenser may comprise inter alia a pump and an evaporator. Thereby, energy being released from the thermal energy storage device may be transferred to the steam turbine via the mentioned evaporator, wherein the operating medium of the steam turbine is transferred from the liquid phase into the gaseous phase.

The described condenser may be driven by air, by a further cooling means and/or by pumped return water from a district heating installation.

According to a further embodiment of the invention the thermal energy storing and recovering system further comprises a control unit, which is connected to at least one of (a) the thermal energy storage device, (b) the heat generating arrangement and (c) the heat converting arrangement. Thereby, the control unit is adapted to control the operation of the thermal energy storing and recovering system.

Specifically, the control unit may be coupled to one or more of the following components: (a) compressor of the heat generating arrangement, (b) a valve of the heat generating arrangement, (c) at least one valve of the thermal energy storage device, (d) at least one circulation pump driving the heat transfer medium through the thermal energy storage device, (e) a (steam) turbine of the heat converting arrangement, (f) a feed pump of the heat converting arrangement, (g) a circulation pump for a cold medium being cycled within a cold reservoir cycle, wherein the cold medium drives (g1) an evaporator of the heat generating arrangement (realized by means of the above described heat pump) and/or (g2) a condenser of the heat converting arrangement (comprises inter alia a steam turbine).

According to a further aspect of the invention there is described a method for operating a thermal energy storage device, which comprises (a) a heat exchanger arrangement, which is configured for guiding a flow of a heat transfer medium between a first end of the a heat exchanger arrangement and a second end of the heat exchanger arrangement, and (b) a heat storage material, which surrounds the heat exchanger arrangement. The described method comprises transporting the heat transfer medium from the first end to the second end, if the thermal energy storage device is in a first operational mode, in which the heat storage material is supposed to receive thermal energy from the heat transfer medium and
transporting the heat transfer medium from the second end to the first end, if the thermal energy storage device is in a second operational mode, in which the heat storage material is supposed to release thermal energy to the heat transfer medium.

Also the described method is based on the idea that by using different transport directions of the heat transfer medium for different operational modes a highly efficient thermal energy storage can be realized. The described principle of using different transport directions for charging and for discharging the heat storage material can be interpreted as a counter current principle.

In particular, the described counter current principle may allow to extract the thermal energy from the thermal energy storage device, wherein the heat transfer medium has at least almost the same temperature as compared to the temperature of the heat transfer medium, when it was used for storing the thermal energy into the thermal energy storage device.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION OF THE DRAWING

FIG. 1 shows a sectional top view of a thermal energy storage device with a heat exchanger arrangement, which comprises a first heat exchange section being associated with the first end, a second heat exchange section being associated with the second end and three connecting section connecting in parallel the first heat exchange section with the second heat exchange section.

FIG. 2 shows a sectional top view of the thermal energy storage device depicted in FIG. 1.

DETAILED DESCRIPTION

Figure 3:
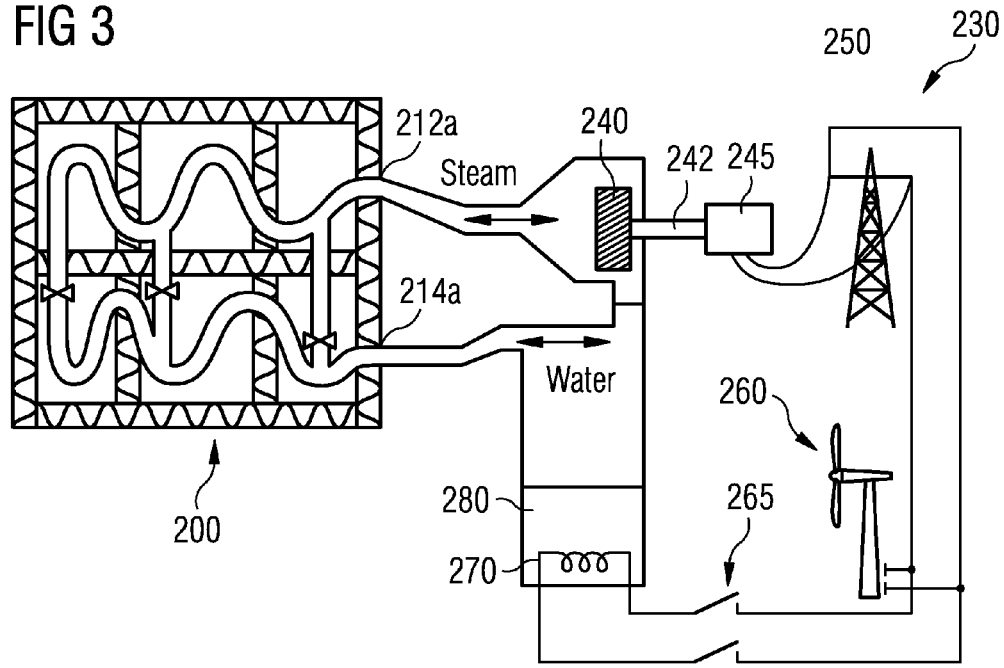
FIG. 3 shows a schematic illustration of a thermal energy storing and recovering system in accordance with a first embodiment of the invention.

The illustration in the drawing is schematically. It is noted that in different figures, similar or identical elements are provided with the same reference signs or with reference signs, which are different from the corresponding reference signs only within the first digit.

FIG. 1 shows a sectional top view of a thermal energy storage device 100. The thermal energy storage device 100 comprises a casing 102, which comprises an insulating material. Therefore, the casing 102 represents an outer insulation wall 108 of the thermal energy storage device 100. The thermal energy storage device 100 further comprises inner insulation walls 104, which segment the volume of the thermal energy storage device 100 into different regions. According to the embodiment described here both the outer insulation walls 108 and the inner insulation walls 104 comprise a mineral wool.

The casing 102 is filled with a heat storage material 108. The heat storage material 108 may comprise sand, soil, ashes, gravel, stone and/or other kind of solid material, which preferably comprises a large specific heat capacity. The whole thermal energy storage device 100 is embedded within ground 120, which may also comprise soil, gravel, stones, rock, ashes and/or sand or similar materials.

The thermal energy storage device 100 further comprises a heat exchanger arrangement 110. The heat exchanger arrangement 110 is embedded with the heat storage material 108. The heat exchanger arrangement 110 comprises a first heat exchange section 112 being associated with a first end 112a of the heat exchanger arrangement 110, a second heat exchange section 114 being associated with a second end 114a of the heat exchanger arrangement 110 and three connecting sections 116, 117 and 118 connecting in parallel the first heat exchange section 112 with the second heat exchange section 114. Within each connecting sections 116, 117 and 118 there is provided a valve 116a, 117a and 118a, respectively. The valves 116a, 117a and 118a can be controlled by a non depicted control unit such that each of the three connecting sections 116, 117 and 118 can be opened, closed or partially opened/closed individually. By closing one or more of the valves 116a, 117a and 118a a flow of heat transfer medium through the heat exchanger arrangement 110 can be controlled. Thereby, sub-regions of the thermal energy storage device 100, which are associated with a closed valve, can be effectively decoupled from the remaining regions of the thermal energy storage device 100. This means that by opening one valve and closing one or more of the other valves the energy storage capacity may be decreased or increased as the used capacity of the heat exchanger arrangement 100 is decreased or increased.

The described thermal energy storage device 100 may be of the size of more than 1000 m long, 100 m wide and 5 m deep. This results in a volume of 500,000 m$^3$. As has already been mentioned above the heat storage material may be sand filled with sand, which has a specific heat capacity of 0.8 kJ/(kg K) and a sand density of 1740 kg/m$^3$. When the sand 108 is heated up from a temperature of 20° C. to 200° C. (=temperature difference of 180° C.), this results in a heat storage capacity of up to 125280 GJ. This corresponds to 34.8 GWh.

Of course, also thermal energy storage devices having other sizes and other operating temperatures may be used in order to get other heat storage capacities.

When operating the thermal energy storage device 100 different operational modes are used (a) for charging the thermal energy storage device 100 with thermal energy and (b) for discharging the thermal energy storage device 100, i.e. for retrieving thermal energy from the thermal energy storage device 100. Specifically, in a first operational mode in which the thermal energy storage device 100 is charged by receiving thermal energy from the heat transfer medium, the heat transfer medium is transported from the first end 112a to the second end 114a. In a second operational mode in which the thermal energy storage device 100 is discharged by providing thermal energy to the heat transfer medium, the heat transfer medium is transported from the second end 114a to the first end 112a. This dependency of the transport direction of the heat transfer medium from the operational state can be interpreted as employing a counter current principle. By using this counter current principle, when thermal energy is recovered from the thermal energy storage device 100, it is possible to heat up the cold heat transfer medium to nearly the same temperature as the inlet temperature of the hot heat transfer medium when thermal energy is inserted into the thermal energy storage device 100. This makes the thermodynamic efficiency of the described thermal energy storage device 100 very high.

FIG. 2 shows a sectional top view of the thermal energy storage device 100. The ends 112a and 114a of the heat exchanager arrangement 100 can be seen on the front side of the thermal energy storage device 100. In this orientation the thermal energy storage device 100 may be placed down into the ground 120.

FIG. 3 shows a schematic illustration of a thermal energy storing and recovering system 230 in accordance with a first embodiment of the invention. According to the embodiment described here water respectively (water) steam is used as a heat transfer medium.

To recover stored energy water is fed into a thermal energy storage device 200 e.g. by means of a not depicted a pumping device through a second end 214a of a heat exchanger arrangement of the thermal energy storage device 200. As a result, steam is coming out of a first end 212a of the heat exchanger arrangement. Thereby, the above described counter current principle is employed, i.e. the flow direction of the water/steam when recovering energy is opposite compared to the flow direction of the water/steam when the thermal energy storage device 200 is charged.

The out coming steam is fed into a steam turbine 240 which drives an electric power generator 245 through a shaft connection 242. The steam in the steam turbine 240 may be overheated by further heating means (not depicted) before the steam reaches the steam turbine 240 to avoid condensation of the steam in the steam turbine 240. The steam is further let into a condenser 280, wherein it turns into water. This condenser 280 may be air driven (ambient air, stationary or ventilation) and/or return water from a district heating installation (not depicted) may be pumped through the condenser 280 to cool and condense the steam.

In order to store thermal energy within the thermal energy storage device 100 the condensed water may be heated by an electric boiler 270. Also a heat pump system (not shown) or any other heating means may be employed. A separate electric boiler or as shown an electric boiler 270 integrated into the condenser 280 and/or the steam turbine 240 may be used.

The steam is then let into the first end 212a of the heat exchanger arrangement of the thermal energy storage device 100 and returns at the second end 214a as condensed water.

In order to ensure a proper direction of the flow of steam and water one or more valves (not depicted) may be located in the system. The electric boiler 270 and the electric power generator 245 may be connected to a utility grid 250 as well as a shown wind turbine 260 or other kind of alternative energy source. The electric boiler 270 may be activated by closing an electric switch 265. In this way electrical energy produced by e.g. the wind turbine 260 may be used by the boiler 270 to heat up water and let it through thermal energy storage device 100. Thereby, thermal energy will be stored within the thermal energy storage device 100. In periods with no or with only little wind or perhaps in periods with too high wind speeds where the wind turbine 260 stands still then water may be pumped through the thermal energy storage device 100. Thereby, the water will be heated up and converted into steam. The steam drives the steam turbine 240, which drives the electrical power generator 245 supplying electrical energy to the utility grid 250.

Figure 4:
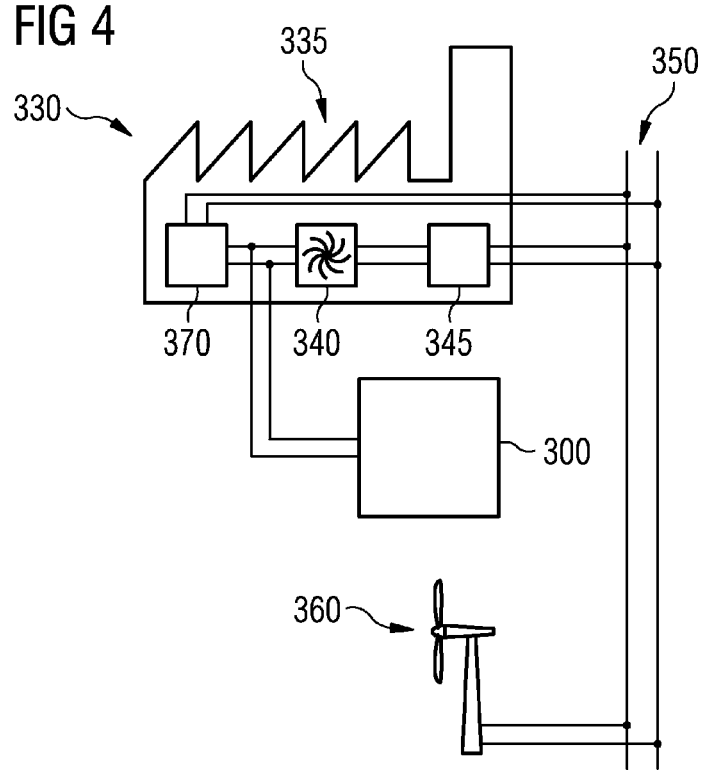
FIG. 4 shows a schematic illustration of a thermal energy storing and recovering system in accordance with a second embodiment of the invention.

FIG. 4 shows schematic illustration of a thermal energy storing and recovering system 330 in accordance with a second embodiment of the invention. In this embodiment, a thermal power generation plant 335 is connected to a utility grid 350 and to a thermal energy storage device 300. According to the embodiment described here the power generation plant 335 comprises a steam turbine 340 with a condenser (not shown) and a connected electrical power generator 345 and an electrical boiler 370. Again, the electrical boiler 370 may be replaced or may be supplemented by means of a heat pump system or other heating means.

The thermal power generation plant 335 is connected to the thermal energy storage device 300 both for energy storage and for recovering of stored energy as explained above with reference to FIG. 3. Also here a wind turbine 360 or other kind of alternative energy resources may be connected to the utility grid 3540.

Figure 5:
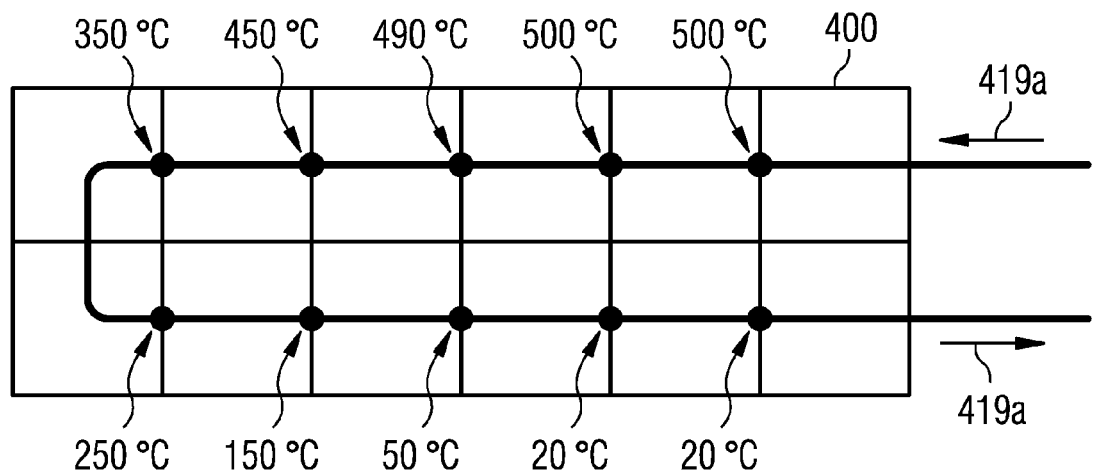
FIG. 5 illustrates an exemplary temperature profile along a pipe of the heat exchanger arrangement of the thermal energy storage device shown in FIG. 1.

FIG. 5 illustrates an exemplary temperature profile along a pipe of the heat exchanger arrangement of the thermal energy storage device shown in FIG. 1. The thermal energy storage device is now denominated with reference numeral 400. In FIG. 5 there is shown a thermal state of a thermal energy storage device 400 after a hot heat transfer medium has been flown through the heat exchanger arrangement at least for some time. This means that the thermal energy storage device 400 is at least partially charged with thermal energy. As a result, at various locations along heat exchanger arrangement, which are indicated as full circles, the following temperatures are present: 500° C., 500° C., 490° C., 450° C., 350° C., 250° C., 150° C., 50° C., 20° C., 20° C.

The flow direction of the heat transfer medium for charging the thermal energy storage device 400 is indicated with arrows 419a. In accordance with the above described counter current principle when retrieving thermal energy from the thermal energy storage device 400 the heat transfer medium is pumped in the opposite direction through the heat exchanger arrangement of the thermal energy storage device shown. In this way when retrieving energy from the thermal energy storage device 400 it is possible to heat up the cold heat transfer medium to nearly the same temperature as the inlet temperature of the hot fluid when charging the thermal energy storage device 400.

Figure 6:
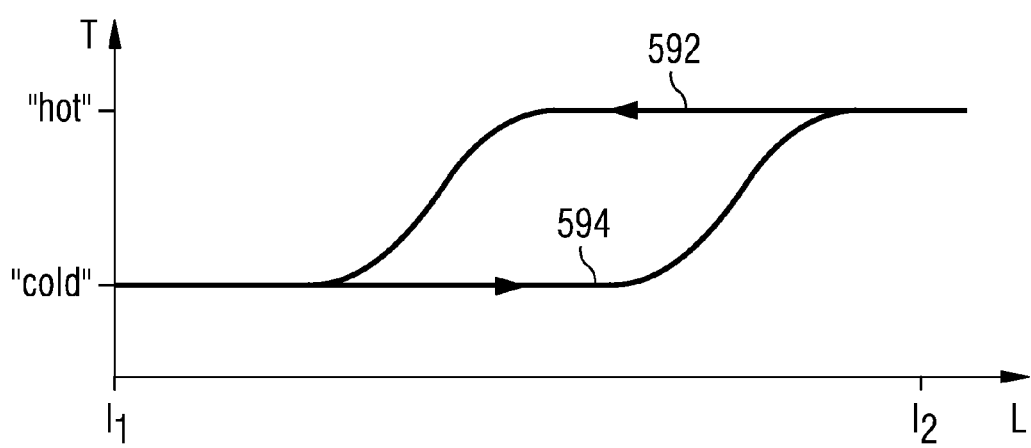
FIG. 6 illustrates the counter current principle by means of the local dependency of the temperature along the pipe of the heat exchanger arrangement, (a) when a heat transfer medium flow along a first direction for charging the thermal energy storage device with thermal energy and (a) when the heat transfer medium flow along a second opposite direction for discharging the thermal energy storage device.

FIG. 6 illustrates the counter current principle by means of the local dependency of the temperature along the pipe of the heat exchanger arrangement. On the abscissa there is plotted the position "L" of a measurement point along the pipe. On the ordinate there is plotted the respective temperature.

When charging the thermal energy storage device the originally hot heat transfer medium flows along the pipe from a hot inlet end "$l_2$" to a cold outlet end "$l_1$". Thereby, the temperature profile 592 will arise. When discharging the thermal energy storage device the originally cold heat transfer medium flows along the pipe from the hot inlet end "$l_1$" to the hot outlet end "$l_2$. Thereby, the temperature profile 594 will arise.

Generally speaking, FIG. 6 illustrates how the heat transfer medium may be respectively heated and cooled when the heat transfer medium is passing through a heat exchanger of a thermal energy storage device using the counter current principle. The temperature gradients for both charge and discharge are maintained throughout the length of the stream of the countercurrent system. In this way it is possible to heat up the cold heat transfer medium to substantially the same temperature as the inlet temperature of the hot heat transfer medium.

Figure 7:
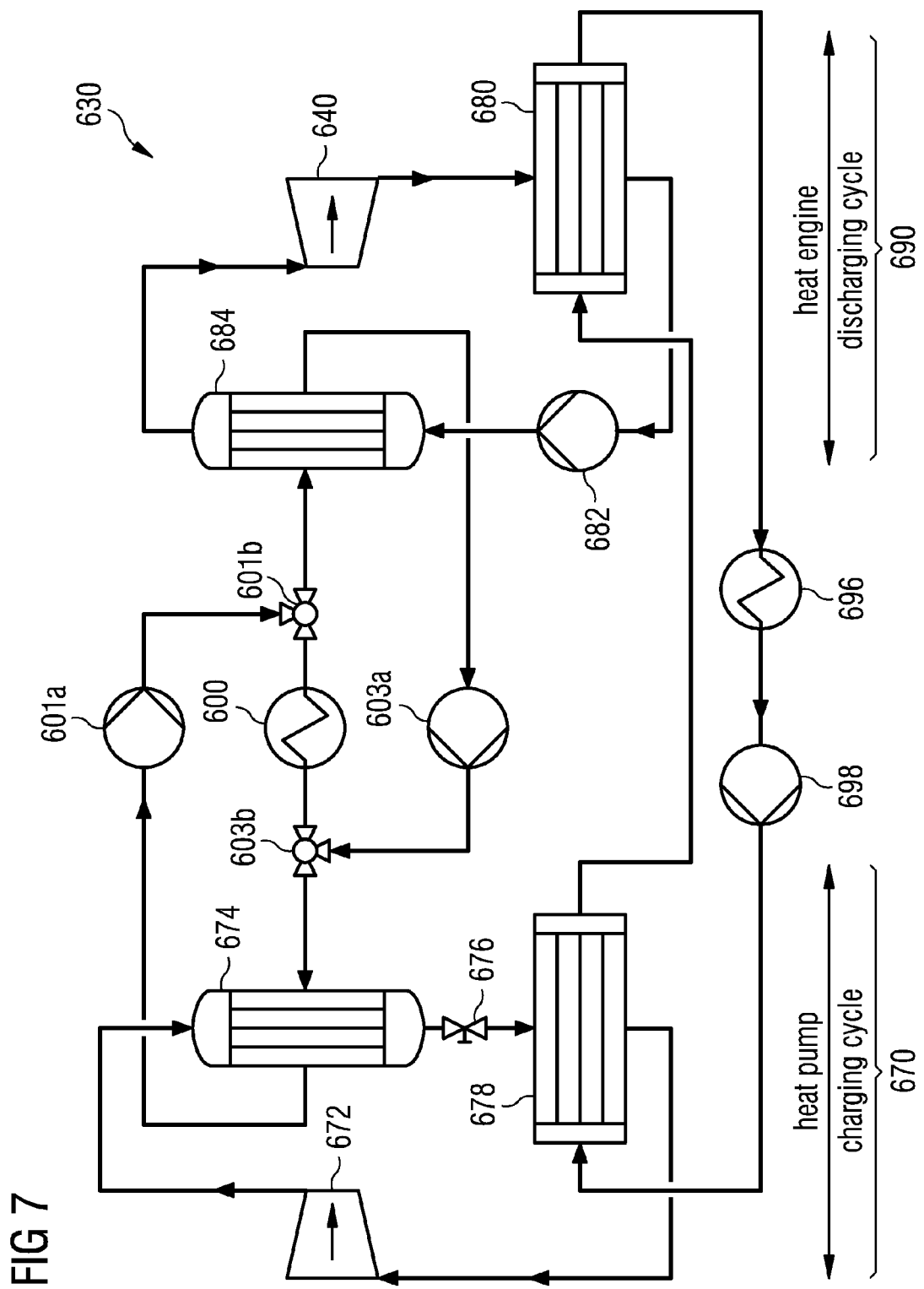
FIG. 7 shows a schematic illustration of a thermal energy storing and recovering system in accordance with a third embodiment of the invention, wherein a charging of a thermal energy storage device is performed by means of a heat pump and a discharging of the thermal energy storage device is performed by means of a heat engine.

FIG. 7 shows a schematic illustration of a thermal energy storing and recovering system 630 in accordance with a third embodiment of the invention. Thereby, charging of a thermal energy storage device 600 is performed by means of a heat pump 670 and a discharging of the thermal energy storage device is performed by means of a heat engine 690.

As can be seen from FIG. 7, the heat engine 690 comprises an evaporator 684, which receive thermal energy from the thermal energy storage device 600. Further, the heat engine 690 comprises a steam turbine 640, which is connected downstream with respect to the evaporator 684. The steam turbine 640 may be connected in a known manner with a not depicted electric generator for converting mechanical energy provided by the steam turbine 640 into electric energy. Furthermore, the heat engine 690 comprises a feed pump 682 which conveys condensed water to the evaporator 684. According to the embodiment described here the heat engine 690 is operated with the well known Rankine cycle.

As can be further seen from FIG. 7, the heat pump 670 comprises a condenser 674 for delivering thermal energy to the thermal energy storage device 600. Further, the heat pump 670 comprises a reduction valve 676, an evaporator 678 and a compressor 672. Since the physical principles of a heat pump are well known to skilled persons for the sake of conciseness no further explanations regarding the operation of the heat pump 670 will be given here.

In order to drive the heat transfer medium through the thermal energy storage device 600 in the proper direction (depending on "charging" or "discharging") the thermal energy storing and recovering system 630 comprises two circulation pumps 601a and 603a and two valves 601b and 603b.

When charging the thermal energy storage device 600 the pump 601a will be active and the pump 603a will be switched off. Further, the valves 601b and 603b are set such that the heat transfer medium exclusively flows through the condenser 674, the pump 601a the valve 601b, the thermal energy storage device 600 and the valve 603b. Thereby, thermal energy is received from the condenser 674 and is provided to the thermal energy storage device 600.

When discharging the thermal energy storage device 600 the pump 601a will be switched off and the pump 603a will be active. Further, the valves 601b and 603b are set such that the heat transfer medium exclusively flows through the evaporator 684, the pump 603a the valve 603b, the thermal energy storage device 600 and the valve 601b. Thereby, thermal energy is picked up from the thermal energy storage device 600 and provided to the evaporator 684.

As can be further seen from FIG. 7, the evaporator 678 and the condenser are thermally connected to a cold reservoir 696. A further heat transfer medium is transported via a circulation pump 698 from the cold reservoir to the evaporator 678 and further on to the condenser 680. In accordance with the basic operating principles of a heat pump the evaporator 678 extracts some thermal energy from the further heat transfer medium. In addition, the cold further heat transfer medium is also used to cool the condenser 680. The cold reservoir 696 may just be air or a river or the sea, but it may also be a dedicated storage unit if the thermal energy storing and recovering system 630 is located far from the sea and water is scarce.

It is mentioned that according to the embodiment described here the condenser 674 and the evaporator 684 act as heat exchangers. This means that the heat transfer medium being transported through the thermal energy storage device 600 is not the operating medium of the steam turbine. Preferably, the heat transfer medium is kept in the same phase all the time. The heat transfer medium may be for instance pressure water, pressurized glycerin and/or vegetable oil.

The thermal energy storage device 600, which can also be referred to as a hot reservoir, could be a long mound of earth having dimensions of e.g. 1000 m in length by 200 m in width by 10 m in height. The thermal energy storage device 600 may be insulated with 2 m of mineral wool. The heat exchanger arrangement may be realized by steel pipes which are placed at closer intervals within the heat storage material. The heat exchanger arrangement may comprise e.g. one 1" pipe per 250 mm, running from one end down the device 600, making a 180-degree bend at the end and then returning on the other side of a centerline insulation. This makes it possible to have the hot and the cold side of the thermal energy storage device 600 at the same end. If the thermal energy storage device 600 is built by excavating in situ, insulation of the bottom, then refilling while packing in the heat exchanger pipes, topping off with insulation at the top, it will only rise 4 m above the surroundings and may even be covered by earth for agricultural purposes. So the landscape impact is very moderate. A reservoir of this size will theoretically have a capacity C of 250 GWh. Thereby, the capacity has been calculated by the following formula:

$$C = V \cdot \rho \cdot c \cdot f \cdot \Delta T$$

Thereby,

V is the volume of the thermal energy storage device, here 1000 m×200 m×10 m;

ρ is the density of the heat storage material, here 1600 kg/m3;

c is the specific heat capacity, here 0.8 kJ/kg/deg;

f is a conversion factor between kWh and kJ, here 1/3600 kWh/kJ; and

ΔT is the temperature difference between the temperature of the charged thermal energy storage device and the discharged thermal energy storage device, here (400° C.-50° C.)

It is mentioned that the system shown in FIG. 7 represents a machine operating with a reversible Carnot cycle. The efficiency of the discharge may be of 40% or more depending on the operating temperature. But the modest efficiency is compensated by the surplus efficiency of the heat pump of up to 200%, leading to a good overall round-trip efficiency of 80% or more. One can even improve on the round-trip efficiency by having a cold reservoir holding cooling water for all equipment, being cooled by the cold side of the heat pump. Thereby all electrical and mechanical heat losses may be fed back into the system.

It should be noted that the term "comprising" does not exclude other elements or steps and the use of articles "a" or "an" does not exclude a plurality. Also elements described in association with different embodiments may be combined. It should also be noted that reference signs in the claims should not be construed as limiting the scope of the claims.

LIST OF REFERENCE SIGNS 100 thermal energy storage device
102 casing/outer insulation wall
104 inner insulation wall
108 heat storage material
110 heat exchanger arrangement
112 first heat exchange section
112a first end
114 second heat exchange section
114a second end
116 first connecting section
116a valve
117 second connecting section
117a valve
118 third connecting section
118a valve
120 ground
200 thermal energy storage device
212a first end
214a second end
230 thermal energy storing and recovering system
240 steam turbine
242 shaft connection
245 electric power generator
250 utility grid
260 wind turbine
265 electric switch
270 electric boiler/heat source
280 condenser
300 thermal energy storage device
330 thermal energy storing and recovering system
335 thermal power generation plant
340 steam turbine
345 electric power generator
350 utility grid
360 wind turbine
370 electric boiler/heat source
400 thermal energy storage device
419 flow direction
592 temperature profile during charging
594 temperature profile during discharging
600 thermal energy storage device
601a circulation pump
601b valve
603a circulation pump
603b valve
630 thermal energy storing and recovering system
640 steam turbine
670 heat source/heat pump
672 compressor
674 condenser
676 reduction valve
678 evaporator
680 condenser
682 feed pump
684 evaporator
690 heat engine
696 cold reservoir
698 circulation pump

The invention claimed is:

1. A thermal energy storage device, comprising:
   a heat exchanger arrangement comprising:
      a first end and a second end
      a first heat exchange section being associated with the first end,
      a second heat exchange section being associated with the second end,
      a first connecting section connecting the first heat exchange section with the second heat exchange section, and
      a second connecting section connecting the first heat exchange section with the second heat exchange section parallel to the first connecting section,
      at least one of the connecting sections comprises a valve for controlling the flow of the heat transfer medium through the respective connecting section
   the heat exchanger arrangement configured for guiding a flow of a heat transfer medium between the first end of the a heat exchanger arrangement and the second end of the heat exchanger arrangement; and
   a heat storage material surrounding the heat exchanger arrangement,
   wherein the heat exchanger arrangement is adapted to
      transport the heat transfer medium from the first end to the second end if the thermal energy storage device is in a first operational mode in which the heat storage material is supposed to receive thermal energy from the heat transfer medium, and
      transport the heat transfer medium from the second end to the first end if the thermal energy storage device is in a second operational mode in which the heat storage material is supposed to release thermal energy to the heat transfer medium.

2. The thermal energy storage device as claimed in claim 1, wherein the heat storage material comprises a solid material.

3. The thermal energy storage device as claimed in claim 2, wherein the solid material comprises sand, soil, ashes, stones and/or gravel.

4. The thermal energy storage device as claimed in claim 1, further comprising thermal insulating means for thermally isolating the whole thermal energy storage device from its environment and/or for thermally isolating different regions of the thermal energy storage device from each other.

5. The thermal energy storage device as claimed in claim 1, wherein the first end and the second end are located at one and same side of the thermal energy storage device.

6. The thermal energy storage device as claimed in claim 1, further comprising a further heat exchanger arrangement configured for guiding a flow of a heat transfer medium between a further first end of the further heat exchanger arrangement and a further second end of the further heat exchanger arrangement, wherein the further heat exchanger arrangement is surrounded by the heat storage material.

7. The thermal energy storage device as claimed in claim 6, wherein the heat exchanger arrangement and the further heat exchanger arrangement form a counter current heat exchanger system,
   wherein the heat transfer medium within the further heat exchanger arrangement and the heat transfer medium within the heat exchanger arrangement are transportable simultaneously, and
   wherein the heat transfer medium within the further heat exchanger arrangement is transportable in an opposite direction with respect to the heat transfer medium within the heat exchanger arrangement.

8. A thermal energy storing and recovering system, comprising:
a thermal energy storage device as claimed in claim 1; and
a heat generating arrangement connected to the thermal energy storage device and adapted to heat up the heat transfer medium received from the thermal energy storage device and to be transported to the thermal energy storage device.

9. The thermal energy storing and recovering system as claimed in claim 8, wherein the heat generating arrangement is directly or indirectly connected to the thermal energy storage device.

10. The thermal energy storing and recovering system as claimed in claim 8, wherein the heat generating arrangement comprises an electric boiler and/or a heat pump.

11. The thermal energy storing and recovering system as claimed in claim 8, further comprising a heat converting arrangement connected directly or indirectly to the thermal energy storage device and adapted to:
extract thermal energy from hot heat transfer medium received from the thermal energy storage device, and
convert the extracted thermal energy into mechanical energy.

12. The thermal energy storing and recovering system as claimed in claim 11, wherein the heat converting arrangement comprises a steam turbine.

13. The thermal energy storing and recovering system as claimed in claim 11, wherein further comprising a control unit connected to at least one of the thermal energy storage device, the heat generating arrangement, and the heat converting arrangement, wherein the control unit is adapted to control operation of the thermal energy storing and recovering system.

* * * * *